March 26, 1968     R. L. GRAY     3,374,990

AERATING APPARATUS

Filed April 14, 1966     2 Sheets-Sheet 1

INVENTOR.
RICHARD L. GRAY

BY *Hamilton & Cook*

ATTORNEYS

INVENTOR.
RICHARD L. GRAY
BY Hamilton & Cook
ATTORNEYS

United States Patent Office 3,374,990
Patented Mar. 26, 1968

3,374,990
AERATING APPARATUS
Richard L. Gray, Orrville, Ohio, assignor of one-half to
Charles F. Herman, Orrville, Ohio
Continuation-in-part of application Ser. No. 372,941,
June 5, 1964. This application Apr. 14, 1966, Ser.
No. 542,500
3 Claims. (Cl. 261—29)

ABSTRACT OF THE DISCLOSURE

Apparatus for aerating liquid in a container constituting a housing enclosing a power supply, a motor, and an impeller having axial air and liquid inputs and a radial output with an extension discharging the fluids within the container liquid; and, a lid selectively attachable to the housing for detachably mounting it on the container and for insertion and removal of the power supply means.

---

This application is a continuation-in-part of my co-pending application Ser. No. 372,941, filed June 5, 1964, now abandoned.

The present invention relates generally to aerating apparatus for recharging a fluid with air. More particularly, the invention relates to pumping apparatus for recirculating a mixture of fluid and air into a container of the fluid. Specifically, the invention relates to a unitary centrifugal pumping apparatus which supplies water having entrained air to a container of the water to maintain an oxygen level which will support and keep alive minnows or other aquatic life consuming small quantities of oxygen.

When minnows, shrimp, or other live bait are placed in an enclosed container of practical size for purposes of transportation, the oxygen is depleted in a short time so that the minnows become sluggish and eventually expire. This can be prevented only by replacing the water frequently with fresh water or introducing a supply of oxygen into the water. In the past, containers were constructed with a plurality of holes to allow circulation of water when the container was submerged in a lake or larger container of fresh water. However, these devices are unsatisfactory in the many instances where fresh water is not conveniently available.

More recently, efforts have been made to reprocess the water in a container to replenish the oxygen content therein. A common type of reprocessing apparatus employs a reciprocating air pump; however, these pumps have proven less than satisfactory due to the high power requirements and sizeable apparatus necessitated. Other types of devices having the same disadvantages include spraying equipment which disperses a jet of water through the air to pick up sufficient oxygen to reconstitute the entire container. In all of the above types of apparatus, high cost precision equipment of appreciable size and weight is necessitated to meet the operating requirements of a conventional live bait container, and the equipment often has a noise level sufficiently high to produce an environment which is uncomfortable for the bait.

Accordingly, a principal object of the present invention is to provide aerating apparatus for charging a container of live bait with oxygen which is of small unitary construction and readily portable.

Another object of the invention is to provide apparatus having a small, integrally contained battery-operated pumping device which aerates and circulates water in a container.

A further object of the invention is to provide aerating apparatus having a centrifugal pump with axial air and fluid inputs and a radial discharge for a mixture of water and entrained air.

Still another object of the invention is to provide aerating apparatus having minimal noise level and vibration to minimize the possibility of causing an uncomfortable environment for the bait.

An additional object of the invention is to provide aerating apparatus having a unitary housing which is readily detachably mounted on a wide variety of conventional bait or general purpose containers.

Another object of the invention is to provide aerating apparatus wherein the pump assembly is energized and de-energized by the insertion and removal, respectively, of a standard battery, thereby protecting the housing and pump assembly from battery leakage.

A still further object is to provide aerating apparatus in which the components may be assembled and disassembled by hand, without tools, when necessary for replacement or inspection.

Other objects are to provide an aerating apparatus which is inexpensive, substantially maintenance-free, and safe to operate.

Various other objects and advantages of the invention will appear from the following description taken in conjunction with the attached drawings, and the novel features will be particularly pointed out hereinafter in conjunction with the appended claims.

Figure 1:
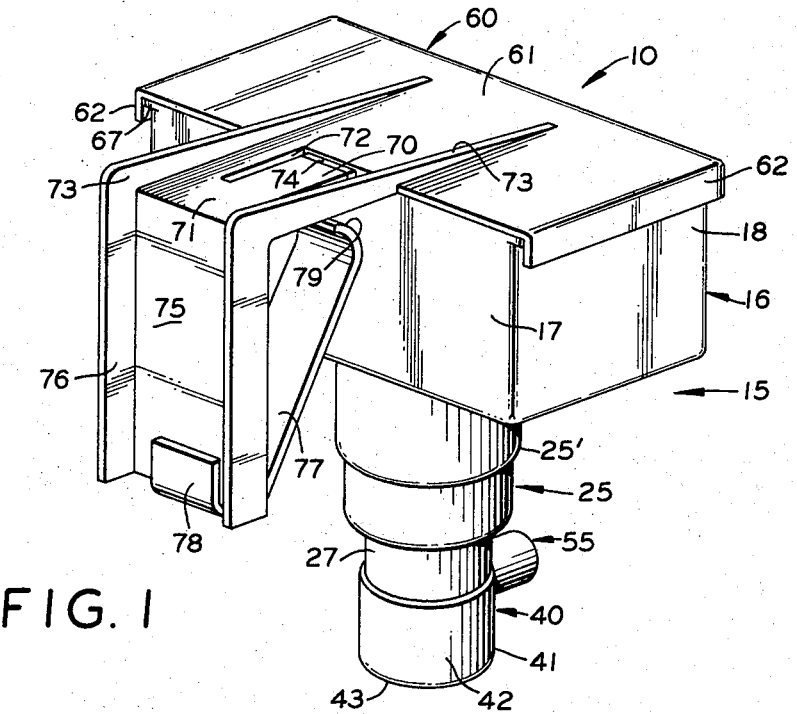
FIG. 1 is a perspective view of aerating apparatus according to the present invention with the unit fully assembled for mounting on a container of live bait.
Figure 2:
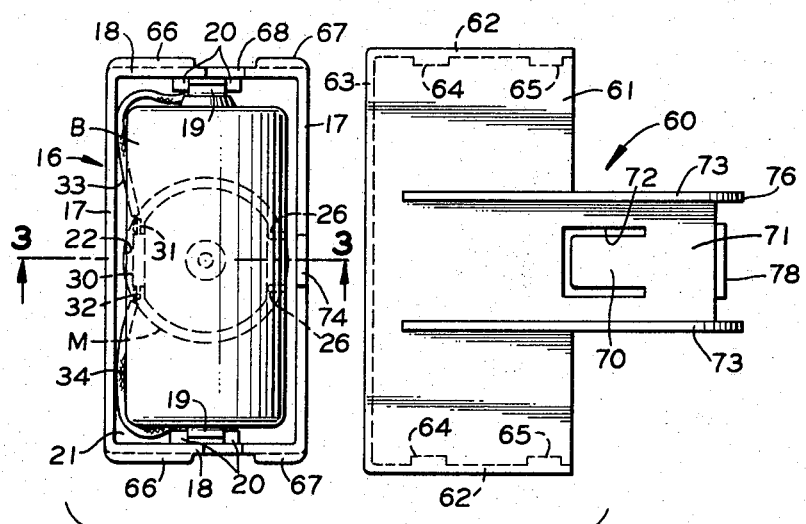
FIG. 2 is a top plan view of the aerating apparatus according to FIG. 1 showing the lid and the battery compartment with the lid removed, at the right and left, respectively.
Figures 3, 4:
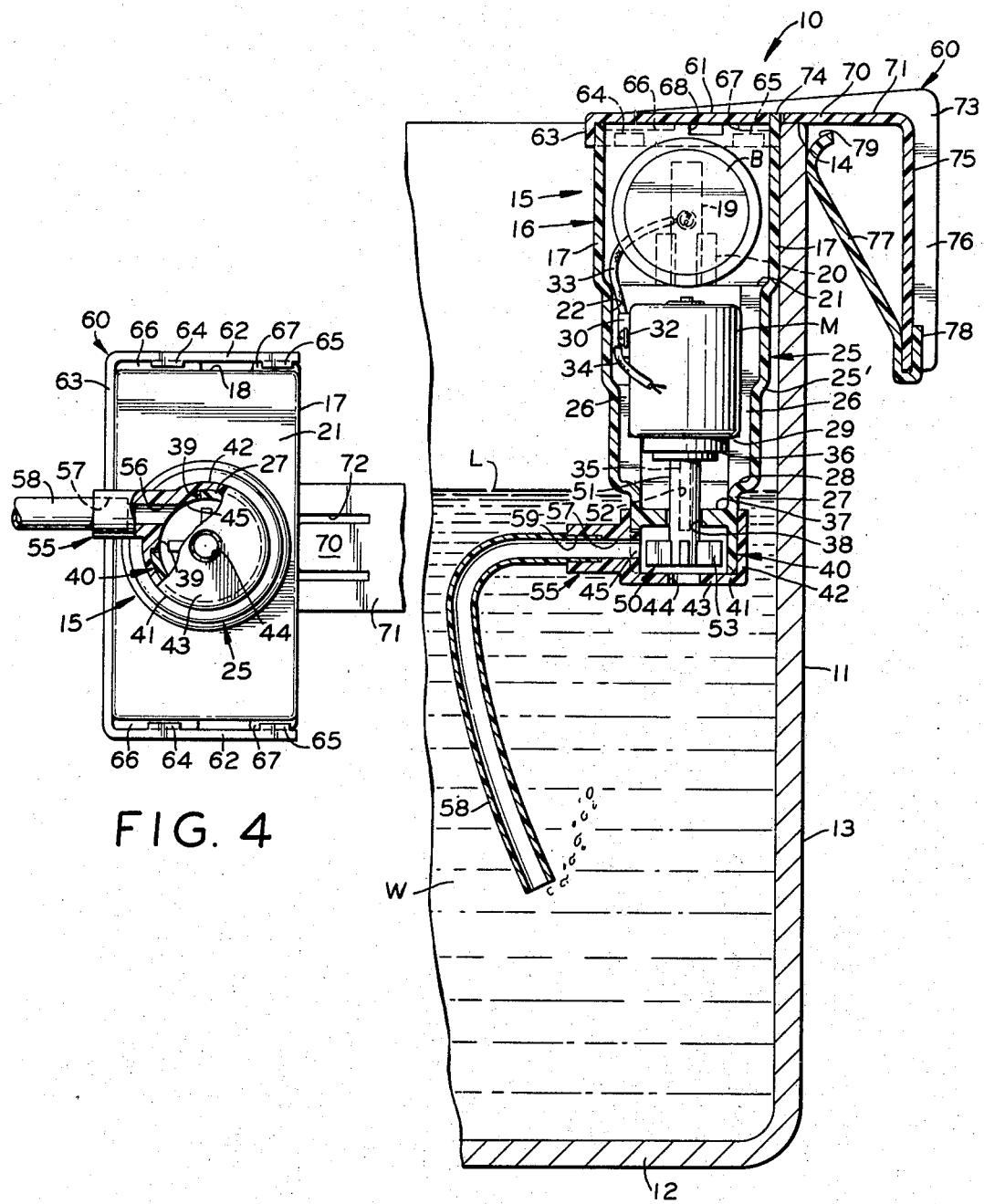
FIG. 3 is a section view of the aerating apparatus, taken substantially on line 3—3 of FIG. 2, mounted on a fragmentary portion of a container of the type used for live bait.
FIG. 4 is a fragmentary bottom plan view of the aerating apparatus according to FIG. 1 with portions broken away to show particularly the details of the pump casing.

Referring now to the drawings generally and particularly to FIGS. 1 and 3, aerating apparatus, generally indicated by the numeral 10, according to the present invention is adapted for use in conjunction with a container 11 for live bait constructed of known metal or plastic materials. As shown in FIG. 3, the container 11 has a bottom wall 12 and an upright vertical wall 13 which may be of circular, rectangular, or other polygonal cross section, suitable for retaining a fluid such as a quantity of water W which will support minnows, shrimp, or other aquatic life. The vertical wall 13 terminates at its upward extremity in a lip or edge 14 which, together with the inner and outer surfaces of the wall 13, supports the aerating apparatus 10. For reasons to be hereinafter explained, the surface level L of the water W must be maintained at approximately a fixed level below the lip or edge 14. The container 11 may be provided with a lid (not shown) which is appropriately cut out to receive the aerating apparatus 10, if desired.

The aerating apparatus 10 includes an elongated body portion or housing, generally indicated by the numeral 15, which serves to support and enclose the operating components. The upper portion of the housing 15 is a power supply or battery compartment, generally indicated by the numeral 16, which may be generally rectangular to house a conventional cylindrical flashlight battery B. The battery compartment 16 has side walls 17 which are spaced a distance slightly greater than the diameter of the battery B and end walls 18 which are spaced a distance slightly greater than the length of the battery B. The battery B is seated, frictionally retained, and makes electrical contact within compartment 16 by a pair of electrical mounting clips 19 disposed at either end to contact the terminals of battery B. Each clip 19 is attached to an end wall 18 of compartment 16 as by longitudinally sliding between a pair of spaced struts 20, 20 which are notched for retentive contact. The struts 20 may be conveniently formed integrally in the compartment 16; however, rivets of a nonconducting material, or other comparable fastening means, may be employed equally well. The mounting clips are preferably constructed of copper, or other similar material having good electrical conductivity characteristics.

Medially of the housing 15 and below the battery compartment 16 a cyindrical tubular enclosure, generally indicated by the numeral 25, seats an electric motor M (FIG. 3). Battery compartment 16 has a bottom wall 21 with an opening 22 leading to the interior of the tubular enclosure 25. The electric motor can thus be inserted through battery compartment 16 and is guided and seated in the tubular enclosure 25 on a plurality of L-shaped ribs 26. According to a preferred form of the invention, the ribs 26 are formed integrally within the tubular enclosure 25, run longitudinally thereof, and are circumferentially spaced to accommodate the particular type of electric motor M which is contemplated. Although the tubular enclosure 16 preferably tapers to a smaller diameter shaft housing 27 forming an annular flange 28, the motor M is spaced from the flange 28 by radial projections 29 constituting the bottom of the L-shaped ribs 26 (FIG. 3) for a purpose to be hereinafter detailed.

The electric motor M is preferably an inductance type, many of which are available on the market in miniature sizes and at reasonable cost. The motor M has an external terminal board 30 which receives electrical power from the battery B by means of a pair of electrical contacts 31, 32. Each of the contacts 31, 32 join one of two leads 33, 34 on the terminal board 30 with one of the clips 19 which contact the terminals at either end of the battery B. Thus, the motor M is energized any time a battery B is inserted in battery compartment 16 and contacts the clips 19. As necessary or desired to provide suitable clearance for the terminal board 30 or other appurtenances, the tubular enclosure 25 may be provided with one or more radially flared sections 25' providing slightly different internal diameters along the length thereof.

Referring now particularly to FIG. 3, the electric motor M has a downwardly projecting shaft 35 which may be provided with a seal 36 at the motor casing to prevent the entrance of small quantities of water which are sometimes present in the shaft housing 27. Intermediate the ends of shaft housing 27 is a radial partition 37 having an input aperture 38 which is preferably coaxially aligned with the motor shaft 35. Below the partition 37, shaft housing 27 has a circumferential slot or groove 39 which may be formed by cutting away a portion of the housing 27 at arcuately displaced intervals.

The shaft housing 27 below the radial partition 37 forms a pump casing, generally indicated by the numeral 40, in cooperation with a cap 41 which is generally cylindrical, matingly slides over the shaft housing 27, and frictionally adheres thereto. The cap 41 has an axial wall 42 and a circular end wall 43 provided with an input opening or aperture 44 which is preferably located substantially coaxially thereof. The cap 41 is held rotationally fixed on shaft housing 27 by an arcuate projection or tongue 45 of suitable angular extent to matingly engage the circumferential slot or groove 39 in the shaft housing 27.

Referring now to FIG. 4, the primary component enclosed in pump casing 40 is an impeller, generally indicated by the numeral 50. The impeller 50 has an elongated hub 51 which, at one end, matingly engages the shaft 35 of motor M and is rotated thereby. Under the normally light load conditions in this environment the hub 51 may be frictionally nonrotationally attached by providing a bore 52 which snugly encases the shaft 35; however, positive restraint in the form of a key may be employed if desired. The medial portion of hub 51 passes through the aperture 38 in partition 37 with substantial circumferential clearance for a purpose to be hereinafter described. At the second or lower end of hub 51, a plurality of circumferentially spaced vanes 53 project outwardly. Although the vanes 53 might be curved for optimum performance, the substantially radial configuration shown provides satisfactory efficiency and advantageous construction simplicity.

The impeller 50 is provided with dual axial inputs for water and air by the configuration of the pump casing 40. Water is directed axially to the bottom of hub 51 through the inlet opening 44 in end wall 43 of cap 41 which is maintained at least partially submerged in the water W. Air is available at the top of vanes 53 of impeller 50 by communication with the atmosphere through the housing 15. The above described clearance between the hub 51 and the aperture 38 in partition 37 allows free ingress of air. Similarly, the ribs 26 space the motor M from the tubular enclosure 25 to allow free passage of air therethrough.

With air and water available at the base of the vanes 53 near the hub 51, the rotation of impeller 50 centrifugally displaces both input constituents radially outwardly while being carried circumferentially on the vanes 53. The rotary action of the impeller and its spacing axially inwardly of pump casing 40 give a turbulent circumferential travel to the constituents inwardly of the lower extremity of shaft housing 27, thereby causing a mixing or whipping action which results in appreciable quantities of air becoming entrained in the water.

The pump casing 40 is totally sealed, except for the input openings and a discharge nozzle, generally indicated by the numeral 55, which is formed in the cap 41. The discharge nozzle 55 has a curved guide wall 56 extending generally tangentially to the circular path of the outer extremities of the vanes 53 of impeller 50 and forming an orifice 57 of preferably circular cross section, although a volute shape could be employed. The orifice 57 of discharge nozzle may discharge directly into the water W, but improved aeration and circulation is achieved by employing a length of tubing or hose 58 which extends well into the container 11 toward the bottom wall 12 to there expel the water and air mixture. The hose 58 may be inserted in an enlarged bore 59 in the discharge nozzle 55 (FIG. 3) and have an inside diameter substantially identical to the diameter of orifice 57 to minimize flow restriction.

Referring now to FIGS. 1–4, inclusive, the entire body portion or housing 15 of aerating apparatus 10 is enclosed and suspended within the container 11 by a lid assembly, generally indicated by the numeral 60. The top of battery compartment 16 is substantially closed by a plate 61 which is generally rectangular and has downward overhangs on each end 62, 62 and on one side 63. Each end overhang 62 has a forward and a rear lug 64 and 65, respectively, which are spaced from and project substantially parallel to the plate 61. The lugs 64, 65 selectively engage a pair of outwardly projecting spaced flanges 66 and 67 at the upper extremities of each end wall 18 of housing 15 to secure the lid assembly 60. In order to insure the availability of input air to impeller 50 when the lid assembly is closed, housing 15 may be provided with one or more air holes such as the cutouts 68 on end walls 18 of battery compartment 16. The position of the cutouts 68 well above the water W and under the overhangs 62 serves to reduce the possibility of accidental introduction of water into the battery compartment 16.

In assembling the aerating apparatus 10 after inserting the battery B, the lid 60 is offset positioned so that the lugs 64 of each overhang 62 project between the flanges 66, 67 of housing 15. Subsequently, the lid 60 is slid laterally into the closed position shown in FIGS. 1, 3 and 4, with the flanges 66, 67 positioned in the space between the plate 61 and lugs 64, 65. Thus, the lid 60 is restrained from vertical separation from the housing 15. Once closed, the lid 60 is preferably provided with means for restraining lateral sliding such as a tongue 70 which is built into an extension 71 of plate 61. The tongue 70 may be formed by making a U-shaped cut 72 in the plate extension 71 between reinforcing ribs 73 which may be employed to impart additional rigidity, if desired. For improved retention, the side 17 of housing 15 may be provided with a small raised flange 74 which the tongue 70 seats behind when the lid 60 is closed. When the lid is to be removed, the tongue 70 may be depressed slightly vertically upwardly to clear the raised flange 74 prior to sliding.

In conjunction with extension plate 71 which seats on the upper edge 14 of container 11 to provide vertical support for housing 15, a support arm 75 is preferably connected to plate 71 to extend at an angle thereto for lateral support. In a manner similar to extension plate 71, the arm 75 may be provided with reinforcing ribs 76 for additional rigidity. In order to provide maximum flexibility for attachment to a number of different types of containers having different wall thicknesses and radii of curvature, the arm 75 is preferably spaced a considerable distance from the housing 15 for attachment to relatively thick-walled containers. In cases where a thinner walled container, such as that depicted in FIG. 3, is employed, an adaptor clip 77 can be attached to the arm 75 to give suitable lateral stability. As shown, the clip 77 has an attachment crook 78 at one end to slide over and frictionally adhere to the arm 75 and a curved bearing surface 79 at the other end to contact a container wall. The adaptor clip 77 is preferably slightly resilent to firmly engage the container wall 13, yet displace outwardly toward the arm 75 when the aerating apparatus 10 is used in conjunction with a container having a greater wall thickness. Other than the exceptions noted above, the entire container is advantageously constructed of polyethylene, polystyrene, or other electrical nonconductor.

The aerating apparatus 10 may be normally stored as an assembled unit, except that the battery B is removed so that the apparatus is not energized and there is no danger of leaking battery fluid damaging the housing 15 or motor M. When a container is to be aerated, the apparatus 10 is prepared by removing the lid 60, inserting a battery B, and replacing the lid in the manner described above. The housing 15 and lid assembly 60 are then mounted on the container to be aerated, and the water adjusted to a point approximately at the bottom of the battery compartment 25 or the upper half of shaft housing 27. This maintains a proper balance between the air and water inputs to the impeller 50 so that water does not engulf the motor M causing damage and a water head does not build up which would cut off the supply of air. Since the aerating apparatus is energized when inserted and for the duration of immersion in the water in a container, there is no danger of flooding the air supply path or creating a water block therein. The aerator may be operated by allowing it to run continuously for several hours until the battery is exhausted and substituting a new battery. Alternatively, the apparatus may be operated only a few minutes each hour which will provide sufficient aeration for a normal size bait container.

A preferred form of the invention has been shown and described in sufficient detail to enable one skilled in the art to practice the invention. Since various modifications in details, materials, and arrangements of parts are within the spirit of the invention herein disclosed and described, the scope of the invention should be limited solely by the scope of the attached claims.

What is claimed is:

1. Aerating apparatus for liquid enclosed in a container comprising, drive means, power supply means selectively energizing said drive means, a housing means encasing said drive means and power supply means and detachably mounted on said container with a portion submerged in the liquid, pump means located in said housing means having an impeller with substantially radial vanes, said pump means selectively energized by said drive means, liquid input means from said container to said pump means, air input means to said pump means, discharge means from said pump means comprising a nozzle having an orifice directed substantially tangentially of the path of said vanes of said impeller and extending into the liquid in said container outwardly of said housing, and tube means attached to said nozzle projecting downwardly into said container to more effectively circulate the liquid.

2. Aerating apparatus for liquid enclosed in a container comprising, drive means, power supply means selectively energizing said drive means, a housing means encasing said drive means and power supply means and detachably mounted on said container by lid means having overhangs with spaced lugs selectively engaging spaced flanges on said housing means, thereby allowing sliding motion but preventing vertical separation between said housing means and said lid means, said lid means being selectively attached to said housing to allow insertion and removal of said power supply means, a portion of said housing means being submerged in the liquid, pump means located in said housing means and selectively energized by said drive means, liquid input means from said container to said pump means, air input means to said pump means, and discharge means from said pump means carrying liquid and entrained air to aerate and circulate the liquid in said container.

3. Apparatus according to claim 2, wherein said lid means has a displaceable tongue selectively engaging a raised flange on said housing to control the sliding motion between said housing means and said lid means.

References Cited

UNITED STATES PATENTS

| | | | |
|---|---|---|---|
| 2,515,538 | 7/1950 | Wall | 261—93 |
| 2,533,936 | 12/1950 | Holmes et al. | 43—57 X |
| 2,601,198 | 6/1952 | Willson | 261—121 |
| 2,863,653 | 12/1958 | Cummings | 261—121 |
| 2,919,120 | 12/1959 | Baxter | 261—121 |
| 3,189,334 | 6/1965 | Bell | 261—121 |
| 3,279,768 | 10/1966 | Niewiarowicz | 261—93 X |

FRANK W. LUTTER, *Primary Examiner.*

HARRY B. THORNTON, *Examiner.*

TIM R. MILES, *Assistant Examiner.*